(12) United States Patent
Holland

(10) Patent No.: US 9,807,556 B2
(45) Date of Patent: Oct. 31, 2017

(54) LOCATOR SYSTEM

(71) Applicant: Bryan Holland, Los Angeles, CA (US)

(72) Inventor: Bryan Holland, Los Angeles, CA (US)

(*) Notice: Subject to any disclaimer, the term of this patent is extended or adjusted under 35 U.S.C. 154(b) by 0 days.

(21) Appl. No.: 14/980,275

(22) Filed: Dec. 28, 2015

(65) Prior Publication Data
US 2016/0112841 A1    Apr. 21, 2016

Related U.S. Application Data

(60) Continuation of application No. 14/791,880, filed on Jul. 6, 2015, now Pat. No. 9,232,356, which is a
(Continued)

(51) Int. Cl.
| | |
|---|---|
| *H04W 4/02* | (2009.01) |
| *G01S 5/00* | (2006.01) |
| *G01S 19/17* | (2010.01) |
| *G01S 19/34* | (2010.01) |
| *G01S 19/48* | (2010.01) |

(Continued)

(52) U.S. Cl.
CPC ........... *H04W 4/023* (2013.01); *G01S 5/0027* (2013.01); *G01S 5/0054* (2013.01); *G01S 5/0231* (2013.01); *G01S 19/17* (2013.01); *G01S 19/34* (2013.01); *G01S 19/42* (2013.01); *G01S 19/48* (2013.01); *G06F 3/0481* (2013.01); *H04L 67/10* (2013.01); *H04L 67/18* (2013.01); *H04L 67/2814* (2013.01); *H04W 4/02* (2013.01); *H04W 4/028* (2013.01); *G01S 19/09* (2013.01); *G01S 2205/008* (2013.01); *H04W 4/22* (2013.01); *H04W 52/0254* (2013.01); *H04W 64/00* (2013.01); *H04W 76/007* (2013.01); *Y02B 60/50* (2013.01)

(58) Field of Classification Search
CPC ....... H04W 4/02; H04W 64/00; H04W 4/025; H04W 4/028; H04W 4/22; H04W 76/007
USPC ....... 455/404.2, 404.1, 456.1–457, 521, 403, 455/422.1, 500, 517, 414.1–414.4, 426.1, 455/426.2; 342/357.01, 357.06, 357.09
See application file for complete search history.

(56) References Cited

U.S. PATENT DOCUMENTS

| | | |
|---|---|---|
| 4,601,005 A | 7/1986 | Kilvington |
| 5,014,040 A | 5/1991 | Weaver et al. |
| (Continued) | | |

FOREIGN PATENT DOCUMENTS

| | | |
|---|---|---|
| CA | 1277400 | 12/1990 |
| EP | 0242099 | 10/1987 |
| (Continued) | | |

OTHER PUBLICATIONS

Office Action from Japanese Patent Application No. 2001-514596, dated Sep. 14, 2010.
(Continued)

*Primary Examiner* — Keith Ferguson
(74) *Attorney, Agent, or Firm* — Stroock & Stroock & Lavan LLP

(57) ABSTRACT

A locator system and method of use is disclosed. The locator system may be used to receive radiolocation signals, calculate location data based on the radiolocation signals, and send the current location data over a telecommunication network to a server computer. A client may request the location data from the server computer and the server may send the location data to the client.

64 Claims, 10 Drawing Sheets

Related U.S. Application Data continuation of application No. 13/972,356, filed on Aug. 21, 2013, now Pat. No. 9,097,785, which is a continuation of application No. 13/604,267, filed on Sep. 5, 2012, now Pat. No. 8,543,083, which is a continuation of application No. 12/126,440, filed on May 23, 2008, now Pat. No. 8,285,247, which is a continuation of application No. 10/866,520, filed on Jun. 10, 2004, now Pat. No. 7,379,729, which is a continuation of application No. 10/843,203, filed on May 10, 2004, now abandoned, which is a continuation-in-part of application No. 09/975,898, filed on Oct. 10, 2001, now Pat. No. 7,016,687, which is a division of application No. 09/364,557, filed on Jul. 29, 1999, now Pat. No. 6,321,091.

(51) Int. Cl.

| | | |
|---|---|---|
| H04L 29/08 | (2006.01) | |
| G01S 5/02 | (2010.01) | |
| G01S 19/42 | (2010.01) | |
| G06F 3/0481 | (2013.01) | |
| G01S 19/09 | (2010.01) | |
| H04W 4/22 | (2009.01) | |
| H04W 76/00 | (2009.01) | |
| H04W 52/02 | (2009.01) | |
| H04W 64/00 | (2009.01) | |

(56) References Cited

U.S. PATENT DOCUMENTS

| | | |
|---|---|---|
| 5,043,736 A | 8/1991 | Darnell et al. |
| 5,119,102 A | 6/1992 | Barnard |
| 5,129,605 A | 7/1992 | Burns et al. |
| 5,223,844 A | 6/1993 | Mansell et al. |
| 5,225,842 A | 7/1993 | Brown et al. |
| 5,235,633 A | 8/1993 | Dennison et al. |
| 5,289,163 A | 2/1994 | Perez et al. |
| 5,317,323 A | 5/1994 | Kennedy et al. |
| 5,323,163 A | 6/1994 | Maki |
| 5,379,320 A | 1/1995 | Fernandes et al. |
| 5,388,147 A | 2/1995 | Grimes |
| 5,416,797 A | 5/1995 | Gilhousen et al. |
| 5,418,538 A | 5/1995 | Lau |
| 5,420,592 A | 5/1995 | Johnson |
| 5,461,365 A | 10/1995 | Schlager et al. |
| 5,461,390 A | 10/1995 | Hoshen |
| 5,483,549 A | 1/1996 | Weinberg et al. |
| 5,485,163 A | 1/1996 | Singer et al. |
| 5,519,403 A | 5/1996 | Bickley et al. |
| 5,543,789 A | 8/1996 | Behr et al. |
| 5,546,445 A | 8/1996 | Dennison et al. |
| 5,576,716 A | 11/1996 | Sadler et al. |
| 5,576,952 A | 11/1996 | Stutman et al. |
| 5,587,715 A * | 12/1996 | Lewis .................. G01S 19/07 342/357.24 |
| 5,617,074 A | 4/1997 | White |
| 5,627,548 A | 5/1997 | Woo et al. |
| 5,629,678 A | 5/1997 | Gargano et al. |
| 5,636,122 A | 6/1997 | Shah et al. |
| 5,652,570 A | 7/1997 | Lepkofker |
| 5,657,008 A | 8/1997 | Bantli |
| 5,663,734 A | 9/1997 | Krasner |
| 5,712,619 A | 1/1998 | Simkin |
| 5,724,243 A | 3/1998 | Westerlage et al. |
| 5,731,757 A | 3/1998 | Layson |
| 5,731,785 A | 3/1998 | Lemelson et al. |
| 5,734,981 A | 3/1998 | Kennedy, III et al. |
| 5,742,233 A | 4/1998 | Hoffman et al. |
| 5,748,148 A | 5/1998 | Heiser et al. |
| 5,757,916 A | 5/1998 | MacDoran et al. |
| 5,794,174 A | 8/1998 | Janky |
| 5,812,087 A | 9/1998 | Krasner |
| 5,815,814 A | 9/1998 | Dennison et al. |
| RE35,916 E | 10/1998 | Dennison et al. |
| 5,828,949 A * | 10/1998 | Silver .................. H04W 68/00 379/170 |
| 5,835,907 A | 11/1998 | Newman |
| 5,838,237 A | 11/1998 | Revell et al. |
| 5,892,454 A | 4/1999 | Schipper et al. |
| 5,914,675 A | 6/1999 | Tognazzini |
| 5,917,433 A | 6/1999 | Keillor et al. |
| 5,929,806 A | 7/1999 | Birchler et al. |
| 5,946,611 A | 8/1999 | Dennison et al. |
| 6,014,080 A | 1/2000 | Layson, Jr. |
| 6,028,537 A | 2/2000 | Suman et al. |
| 6,085,097 A | 7/2000 | Savery et al. |
| 6,115,611 A | 9/2000 | Kimoto et al. |
| 6,121,922 A | 9/2000 | Mohan |
| 6,122,521 A | 9/2000 | Wilkinson et al. |
| 6,131,067 A | 10/2000 | Girerd et al. |
| 6,133,871 A | 10/2000 | Krasner |
| 6,243,039 B1 | 6/2001 | Elliot |
| 6,243,647 B1 | 6/2001 | Berstis et al. |
| 6,321,031 B1 | 11/2001 | Holland |
| 6,324,404 B1 | 11/2001 | Dennison et al. |
| 6,349,201 B1 | 2/2002 | Ford |
| 6,377,810 B1 | 4/2002 | Geiger et al. |
| 6,421,608 B1 | 7/2002 | Motoyama et al. |
| 6,456,852 B2 | 9/2002 | Bar et al. |
| 6,509,830 B1 | 1/2003 | Elliott |
| 6,542,726 B2 | 4/2003 | Watanabe |
| 6,621,452 B2 | 9/2003 | Knockeart et al. |
| 6,819,929 B2 | 11/2004 | Antonucci et al. |
| 6,847,822 B1 | 1/2005 | Dennison et al. |
| 2002/0077116 A1 | 6/2002 | Havinis |
| 2005/0075114 A1 | 4/2005 | Dennison et al. |

FOREIGN PATENT DOCUMENTS

| | | |
|---|---|---|
| EP | 0379198 | 7/1990 |
| EP | 0512789 | 6/1994 |
| JP | H03-120995 | 5/1991 |
| JP | H06-165246 | 6/1994 |
| JP | H08-009450 | 12/1996 |
| JP | H09-018427 | 1/1997 |
| JP | H10-221426 | 8/1998 |
| JP | H10-341487 | 12/1998 |
| WO | 94/28434 | 12/1994 |
| WO | 97/14049 | 4/1997 |
| WO | 97/14054 | 4/1997 |
| WO | 97/33382 | 9/1997 |
| WO | 99/56144 | 11/1999 |

OTHER PUBLICATIONS

Office Action from Japanese Patent Application No. 2001-514596, dated Mar. 6, 2012.

Office Action from Japanese Patent Application No. 2013-192862 dated Aug. 4, 2014.

* cited by examiner

LOCATOR SYSTEM

CROSS-REFERENCE TO RELATED APPLICATIONS

This application is a Continuation of U.S. patent application Ser. No. 14/791,880, filed Jul. 6, 2015, which is a Continuation of U.S. patent application Ser. No. 13/972,356, filed Aug. 21, 2013, which is a Continuation of U.S. patent application Ser. No. 13/604,267, filed Sep. 5, 2012, which is a Continuation of U.S. patent application Ser. No. 12/126,440, filed May 23, 2008, now issued as U.S. Pat. No. 8,285,247, which is a Continuation of U.S. patent application Ser. No. 10/866,520, filed Jun. 10, 2004, now issued as U.S. Pat. No. 7,379,729, which is a Continuation of U.S. patent application Ser. No. 10/843,203, filed May 10, 2004, which is a Continuation-in-Part of U.S. patent application Ser. No. 09/975,898, filed Oct. 10, 2001, now issued as U.S. Pat. No. 7,016,687, which is a Divisional of U.S. patent application Ser. No. 09/364,557, filed Jul. 29, 1999, now issued as U.S. Pat. No. 6,321,091, wherein all of the U.S. priority applications are herein incorporated by reference.

BACKGROUND OF THE INVENTION

1. Field of the Invention

This disclosure pertains generally to locating and tracking systems.

2. The Prior Art

Wireless devices of all kinds have been in use for pinpointing objects, people and animals on the surface of the earth, under water, or in space. Some wireless devices also provide navigational information such as whether or not a moving vessel or vehicle is "on course" to its predetermined destination. Radio frequency (RF) location and navigation systems are the oldest, and more recently developed devices function at infrared (IR) and visible wavelengths. Acoustic location and navigation systems such as sonar also exist.

Traditional radiolocation is the process of determining the position of a vehicle, aircraft, or vessel. Radionavigation is the use of radio apparatus, by personnel aboard moving vessels, for the purpose of plotting and maintaining a course.

The simplest method of radiolocation is known as the "directional method" wherein two or more fixed receiving stations, which are separated by a fixed distance, receive radio transmission signals from a transmitter that is mounted on a vessel. The vessel location is determined from the intersection of great circles drawn outward from the receiver station points in the appropriate directions.

A second implementation for determining the position of objects involves radar. The term "radar" is an acronym derived from the words "radio detection and ranging." Electromagnetic (EM) waves having certain frequencies reflect from various objects, particularly if those objects contain metals or other electrical conductors. Using a transmitter, receiver, and a display at a fixed station, the location of flying objects with respect to the fixed location may be determined by ascertaining the directions from which radio signal are returned, and by measuring the time it takes for an EM pulse to travel from the transmitter to a target and back. However, such radar systems are not useful for tracking a ground moving objects, or objects that have poor EM reflective properties. Additionally, radar systems are not normally useful for differentiating the identity of objects, particularly when there is a plurality of objects.

The most sophisticated radiolocation and radionavigation techniques employ the global positioning system (GPS). The GPS is a network of radiolocation and radionavigation apparatus that operates on a worldwide basis. The GPS system employs several satellites and allows determination of latitude, longitude, and altitude.

Most recently, vehicle location and navigation systems have been adapted to track the location of automobiles using the GPS system. Such systems include sensors, which are fixed to the automobile and draw power from either the car battery or a second large power source. The purpose of fixing the automobile tracking sensor to the vehicle is primarily for security reasons. Because one main purpose of the tracking system to locate the vehicle in cases of theft, it is important that the sensor systems of the tracking systems be mounted or otherwise fixed to the vehicle, making such sensor systems not easily removed or transportable from a first object to a second object. Furthermore, because a large power source such as a car battery is normally available to such tracking systems, intelligent power saving or conserving features are not provided.

Accordingly, there is a need for a tracking and locating system and method which provides for a lightweight and portable tracking locator device, which is easily transferable from user to user or object to object, which provides power saving and conserving features associated with the locator device, and which further provides positional information of such locator devices in the form of hypertext markup language pages viewable on the Internet. The present invention satisfies these needs, as well as others, and generally overcomes the deficiencies found in the background art.

BRIEF DESCRIPTION OF THE DRAWINGS

The present invention will be more fully understood by reference to the following drawings, which are for illustrative purposes only.

DETAILED DESCRIPTION OF THE PREFERRED EMBODIMENTS

Figure 1:
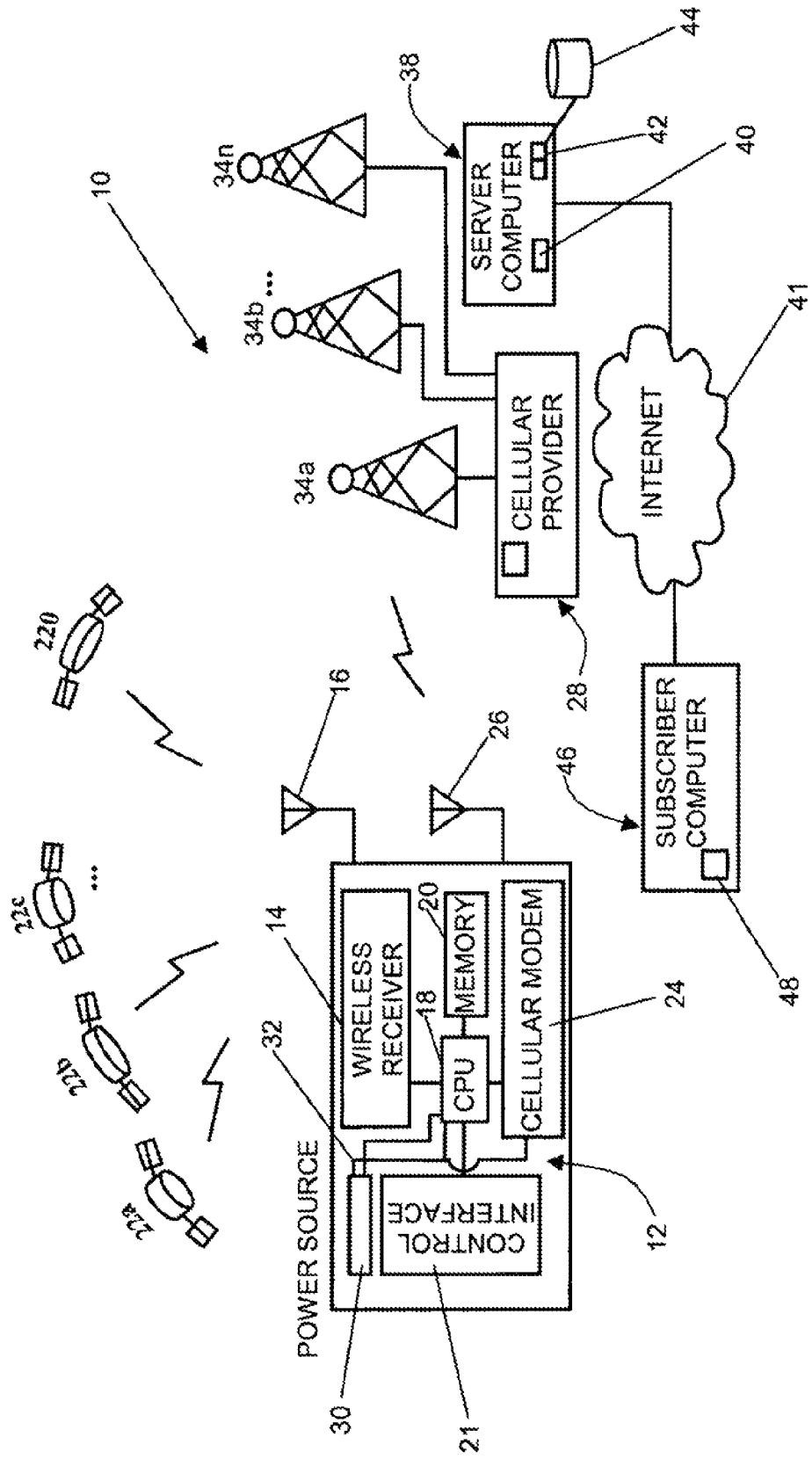
FIG. 1 is a block diagram of a locating system in accordance with the present invention.
Figure 2:
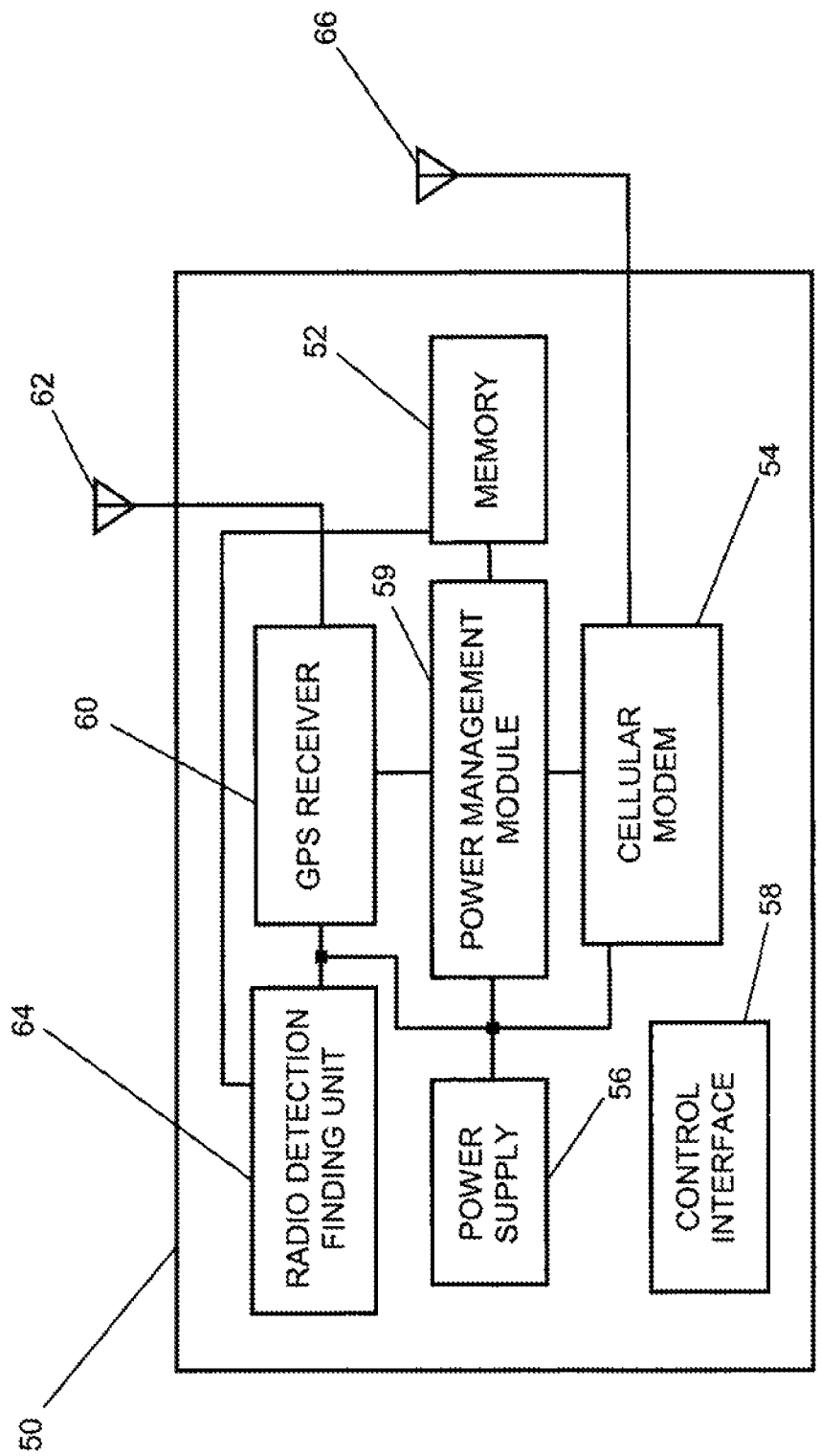
FIG. 2 is a block diagram of an alternative portable locator device.
Figure 3:
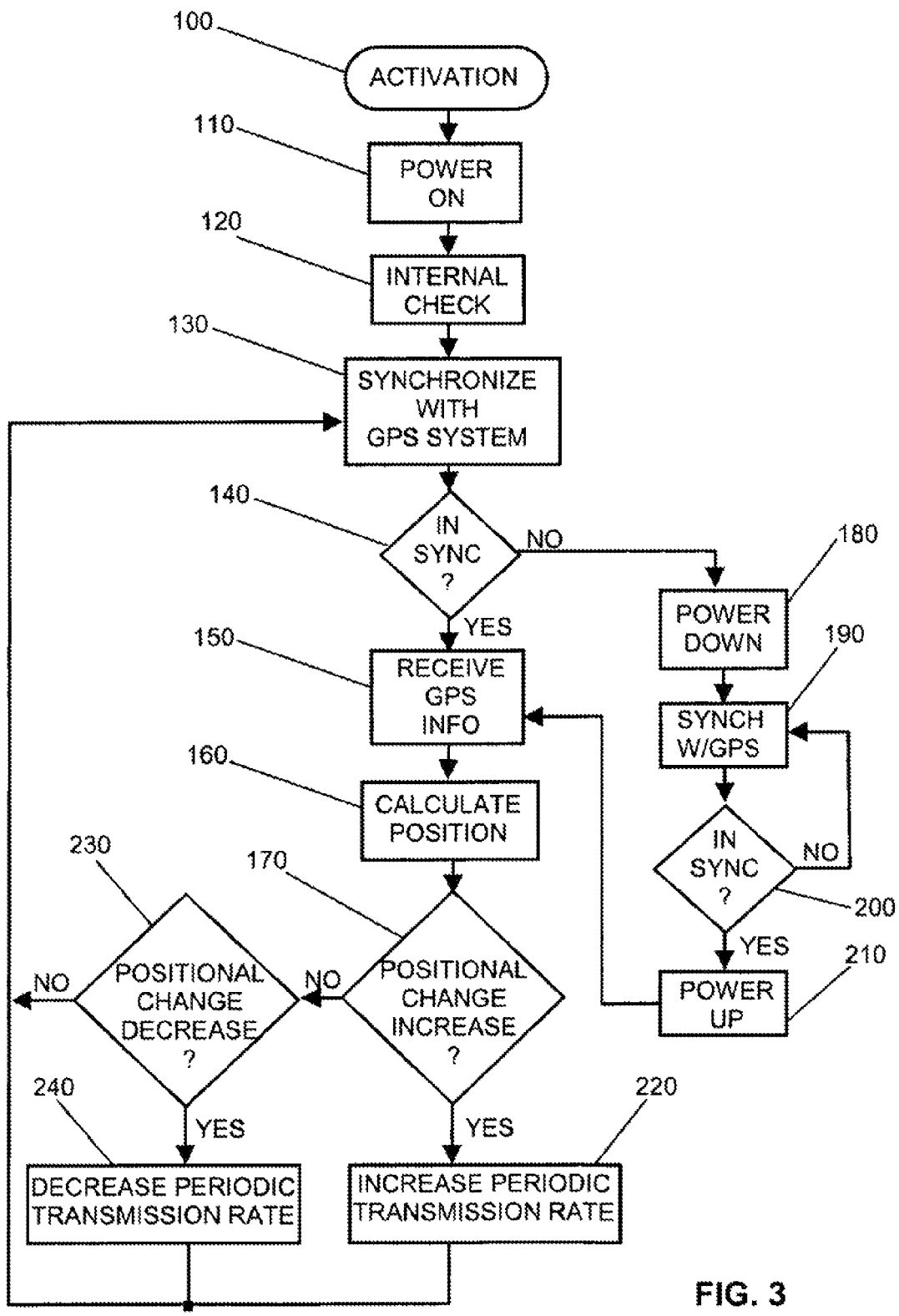
FIG. 3 is a flowchart showing generally the steps involved in carrying out the power management means of the invention.

Referring more specifically to the drawings, for illustrative purposes the present invention is embodied in the system shown FIG. 1 through FIG. 2 and the method outlined in FIG. 3. It will be appreciated that the apparatus may vary as to configuration and as to details of the parts, and that the method may vary as to details and the order of the steps, without departing from the basic concepts as disclosed herein. The invention is disclosed generally in terms of a tracking and locating system and method, although numerous other uses for the invention will suggest themselves to persons of ordinary skill in the art.

Referring first to FIG. 1, there is shown generally a block diagram of a tracking and locating system 10 in accordance with the invention. The system 10 comprises a locator device 12 having means for generating positional information of the locator device. The present system is configured to locate and track one or more locator devices, each operating as locator device 12 as described herein, and each having a unique identifier or serial number associated therewith. The positional information generating means comprises a receiver 14 connected to an antenna 16 and a central processing unit (CPU) 18 connected to memory 20. The receiver 14 is operatively coupled for communication with the CPU 18.

A control interface 21 is provided to accept input commands from a user of the locator device 12. The control interface 21 in connected to the CPU 18 for processing of input commands issued at the control interface 21 by the user of locator device 12 and to a power source 30 for providing typical activation means for the locator device 12.

The antenna 16 comprises a standard radio-frequency (RF) transducer as is known in the art for receiving electromagnetic wave signals from a plurality of visible radio-location transmitters. The term "visible" refers to the ability of the locator device to receive synchronization signals and timing signals and other informational data from the radio-location transmitter. In the preferred embodiment, the radio-location transmitters comprise global positioning system (GPS) satellites 22a through 22n, although land-based radio-location transmitters may also be used. The GPS satellites transmit signals in the UHF part of the radio spectrum, thus the antenna 16 of the preferred embodiment is structured and configured to receive signals in the UHF frequency range.

The receiver 14 comprises standard circuit stage components or like hardware for detecting and receiving radio frequency signals as in known in the art and carries out the operation of scanning the input stream received by antenna 16 and demodulating GPS signal data into serial data for use by the CPU 18. In an illustrative embodiment the receiver unit 14 is an ASHTECH® G-8 model unit. This serial data produced by the receiver unit 14 is then communication to the CPU 18 for further processing as described in more detail below.

GPS satellites 22a through 22n transmit signals having special codes containing information used by various receiving apparatus for calculating position. The CPU includes program means running thereon for determining the location of the locator device 12 as in known in the art. In general, the CPU 18 calculates the distance between the locator device 12 and the GPS satellites 22a through 22n using the timing signals provided by the GPS satellites 22a through 22n, and carries out standard radiolocation calculations to formulate "positional data" which is the location of the locator device 12 relative to the positions of the GPS satellites 22a through 22n. The timing signals as well as the positions of the GPS satellites are communicated to the locator device 12 though the code signals transmitted by the GPS satellites 22a through 22n. The positional data formulated by the CPU 18 includes latitude, longitude, and altitude information about the locator device 12. The positional data formulated by the CPU 18 is further maintained or recorded in a log in the memory 20 for later computation as described in conjunction with FIG. 3. The CPU 18 also carries out the operation periodically communicating the computed positional data to a wireless modem device for further transmission as described below.

The locator device 12 further comprises a cellular modem 24 operatively coupled the CPU 18. The cellular modem 24 includes an antenna 26 and may be any cellular modem or personal communication services (PCS) modem, however a cellular modem is preferred because of the pervasiveness of cellular service availability. In an illustrative embodiment, the cellular modem 24 comprises a MOTOROLA® 505sd modem. The cellular modem 24 carries out the operation of transmitting the positional data received from the CPU 18 and communicating such positional data to a wireless service provider. Preferably the wireless service provider is a cellular service provider 28. The cellular frequency for such communication is typically designated by the cellular provider 28.

The locator device 12 also comprises a power source 30 provided therein. The power source 30 is normally a standard battery. The power source 30 provides power to the various elements of the locator device 12 including the receiver 14, the CPU 18, the memory 20 and the cellular modem 24. The CPU 18 communicates with power source 30 via line 32 and includes program means residing thereon for managing power usage and consumption of device 12 as described below in conjunction with FIG. 3.

Preferably, the receiver 14, the CPU 18, the memory 20, the cellular modem 24 are mounted on a circuit board or like hardware device and is housed within a casing unit (not shown). The power source 30 is also provided within the casing unit. The control interface 21 may be provided integral with the casing unit or provided on the outer surface of the casing unit and preferably includes switches or other similar controls (not shown) for accepting external input from a user of the locator device 12.

The cellular provider 28 is in wireless communication with the locator device 12 via radio signals transmitted by the cellular modem 24 for the purposes of receiving the positional data information transmitted the by locator device 12. As noted above, in the preferred embodiment, the wireless modem of locator device 12 comprises cellular modem 24, and the wireless service provider is cellular provider 28. Generally, cellular provider 28 comprises a network of antennas 34a through 34n each of which includes means for receiving from and transmitting data to the cellular modem 24 as is generally known in the art. A base device 36 is provided with the cellular provider 28 and is operatively coupled to the receiving and transmitting means of the antennas 34a through 34n thus forming a "cellular network". The base device 36 includes means for managing the communication exchange of the devices participating in the cellular network as in known in the art. The cellular provider 28 communicates positional data received from the locator device 12 to a server computer 38 for further processing.

The server computer 38 comprises a standard computer such as a minicomputer, a microcomputer, a UNIX® machine, mainframe machine, personal computer (PC) such as INTEL®, APPLE®, or SUN® based processing computer or close thereof, or other appropriate data processing means. Server computer 38 also includes typical components (not shown), such as a motherboard, central processing unit (CPU), random access memory (RAM), hard disk drive, display adapter, other storage media such as diskette drive, CD-ROM, flash-ROM, tape drive, PCMCIA cards and/or other removable media, a monitor, keyboard, mouse and/or other user interface means, a modem, network interface card (NIC), and/or other conventional input/output devices.

The server computer 38 is operatively coupled with the cellular provider 28 to receive positional data information, normally through a fast data connection means, such as T1, T3, multiple T1, multiple T3, or other high-speed conventional data connection means. Server computer 38 and cellular provider 28 can alternatively connect to each other using a standard Internet connection means, cable means, telephone means, wireless means, or other means for establishing a communication network. Server computer 38 is also operatively coupled to the Internet shown generally as 41 via a fast connection means, such as T1, T3, multiple T1, multiple T3, or other high-speed conventional data connection means. Alternative methods for connection server computer 38 to the Internet as is known in the art may also be used.

Server computer 38 also has loaded in it RAM a conventional server operation system (not shown) such as UNIX, WINDOWS NT, NOVELL, SOLARIS, or other server operating system. Server computer also has loaded in its RAM web server software 40 and database software 42. The web server software 40 carries out the operation of handing hypertext transfer protocol (HTTP) or Web page request as described further below.

The database software 42 carries out the operation of storing, retrieving, accessing, deleting and updating database information stored in database 44. The database 44 contains information related to each locator device 12 of the system 10. Positional data information about locator devices is stored in a tracking table (not shown) within the database 44.

The tracking table includes, for example, a plurality of LID numbers corresponding to each locator device's identifying code or serial number, data location information such as latitude, longitude, and altitude, the date and time when such data location information was entered, and other pertinent information associated with each LID number. Subscriber data information about subscriber users is stored in a subscriber table (not shown) within the database 44.

The subscriber table includes, for example, a plurality of SID number corresponding to each subscriber user, with a username or screen name, e-mail address, password, the LID or locator devices the subscriber may track, and other pertinent subscriber user information. The subscriber table is related to the tracking table via the common LID field residing in both tables. Thus positional data information related to a subscribe SID in the subscriber table may be obtained by querying the positional data information in the corresponding LID field in the tracking table.

As positional data is received by server computer 38 from the cellular provider 28, the database software 42 parses the data information into locator device identity information and positional data information, and stores such information along with the current date and time into the corresponding fields in the tracking table. Thus the tracking table constantly maintains current positional data information of the various locator devices participating in the system 10.

A subscriber computer 46 is provided in the system for allowing a subscriber user wishing to track a particular locator device. Subscriber computer 46, like server computer 38, preferably comprises as standard computer such as a minicomputer, a microcomputer, a UNIX® machine, mainframe machine, personal computer (PC) such as INTEL®, APPLE®, or SUN® based processing computer or close thereof, or other appropriate data processing means.

Server computer 38 also includes typical components (not shown), such as a motherboard, central processing unit (CPU), random access memory (RAM), hard disk drive, display adapter, other storage media such as diskette drive, CD-ROM, flash-ROM, tape drive, PCMCIA cards and/or other removable media, a monitor, keyboard, mouse and/or other user interface means, a modem, and/or other conventional input/output devices. Subscriber computer 46 also loaded in its RAM an operating system (not shown) such as UNIX, WINDOWS 98 or the like.

Subscriber computer 46 further has loaded in ram a Web browser program 48 such as NETSCAPE, INTERNET EXPLORER, AOL, or like browsing software for client subscriber computers. Subscriber computer 46 is normally embodied in conventional desktop or "tower" machine, but can alternatively be embodied in a portable or "laptop" computer, a handheld personal digital assistant (PDA), a cellular phone capable of browsing Web pages, an Internet terminal capable of browsing Web pages such as WEBTV, or other Web browsing devices.

Subscriber computer 46 is operatively coupled for communication with the server computer 38, typically via the Internet 41 through a phone connection using a modem and telephone line (not shown), in a standard fashion. The subscriber user of subscriber computer 46 will typically dial the user's Internet service provider (ISP) (not shown) through a modem and phone line to establish a connection between the subscriber computer 46 and the Internet 41. As described above, server computer 38 is operatively coupled for communication to the Internet 41. Since computers connected to the Internet 41, are themselves connected to each other, the Internet 41 establishes a network communication link between the subscriber computer 46 and the server computer 38. Generally, subscriber computer 46 and server computer 38 communicate using the TCP/IP (transfer control protocol/internet protocol). More specifically, the Web browser software 48 residing in the subscriber computer 46 communicates with the Web server software 40 residing in the server computer 38 via the HTTP protocol. However, other protocols for communication may also be utilized, including PPTP, NetBEUI over TCP/IP, and other appropriate network protocols.

The subscriber user of subscriber computer 46 requests positional data information by accessing the Web browser software 48 and contacting the Web server software 40 residing on server computer 38. Normally, a subscriber user will make a request to the server computer 38, which is received by Web server software 40. Web server software 40 validates the identity of subscriber user to ensure that the user requesting positional data information is the appropriate authorized user. This validation or authorization is normally carried out though standard challenge/response security authentication involving a user name and a password.

Once the subscriber user is validated, the Web server software 40 issues a query to the database software 42 for positional data of locator devices that the subscriber user is authorized to track or locate. Responsive to this query request, the database software 42 formulates a query to extract positional data from the tracking table in the database 44 and returns the query result to the Web server 40. After receiving the positional data from the database software 42, the Web server 40 merges the positional data with textual information and convolves the positional data with a map overlay to produce a image having the positional data superimposed on a map image. Various mapping software programs available in the art may be used for convolving the positional data information. The Web server 40 then transmits the textual and image positional data information in the form of hypertext markup language (HTML) to the subscriber user accessing the subscriber computer 46 for viewing thereon using the Web browsing software 48.

The HTML page presented to the subscriber may also include a Java™ applet, which shows the positional information in a form of an image. The Java applet may dynamically depict the positional movement of the device by updating or refreshing the image of the positional information as the locator device 12 changes location. Various other means known in the art may be used to dynamically update the image of the positional information including, for example, a refresh rate which reloads new positional data images on the HTML page, or streaming video such as RealVideo™, Quicktime™, VDO™, MPEG or other like streaming video technologies. Such steaming videos depict the movement of the locator device over a map background.

Referring now to FIG. 2, a block diagram of an alternative locator device is shown and designated as 50. Locator device 50 carries out substantially the same functions as described above for locator device 12. To this end, the locator device 50 includes means for generating its positional data information connected to memory 52, a cellular modem 54 connected to the positional information generating means, a power supply 56, a control interface 58 connected to the positional information generating means, and power management module 59.

The means for generating positional data information comprises a GPS receiver 60 connected to an antenna 62, and a radio detection finding (RDF) unit 64 connected to the GPS receiver 60. The GPS receiving 60, like receiver 14, comprises standard circuit stage component for detecting and receiving radio frequency signal as in known in the art and carries other operation of scanning the input stream received by antenna 62. The receiver 60 demodulates GPS signals from the input stream into serial data for use by the RDF unit 64 to ascertain the positional data of locator unit 50 as described further below. The antenna 62, like antenna 16, comprises a RF transducer as in known in the art and is structured and configured to receive GPS signals produced by satellites 22a through 22n.

The RDF unit 64 comprises circuitry or like hardware having means for calculating its distance from visible GPS satellites 22a through 22n using the timing signals provided by the GPS satellites 22a through 22n. The calculating means of the RDF unit 64 comprises standard radiolocation calculation methods as is known in the art. The calculation means of the RDF unit 64 further formulates its positional data in the form of latitude, longitude, and altitude, from the above mentioned calculation methods. This positional data is maintained or recorded in a log in the memory 52 for later computation, and is communicated to the cellular modem 54 for further transmission as described below.

The power supply 56 is normally a battery supply and provides power to the various elements of the locator device 50, including the GPS receiver 60, the RDF unit 64, the power management module 59, the memory 52, and the cellular modem 54.

The controller interface 58, like control interface 21, carries out the operation of interpreting external commands issued by the user of locator device 50 and communicating such commands to the RDF unit 64 and the power management module 59. For example, when the user of locator device 50 activates the unit by pressing an activation switch (not shown) on the control interface, a signal is communicated to the power management module 59 to activate the power supply 58, which provides power to the corresponding elements of the device 50. Alternatively, a simple switch (not shown) connected to the power supply 56 could be provided at the control interface 58, to provide similar activation means.

The cellular modem 54, like cellular modem 24, comprises standard circuitry for cellular communication and modulation and includes an antenna 66 connected thereto. In an illustrative embodiment, the cellular modem 54 comprises a MOTOROLA® 505sd modem. The cellular modem 54 carries out the operation of transmitting the positional data received from the RDF unit 64 and communicating such positional data to the cellular provider 28.

The method and operation of the invention will be more fully understood by reference to the flow chart of FIG. 3. FIG. 3 illustrates generally the steps associated with the power management means of the invention. The order of steps as shown in FIG. 3 are only exemplary, and should not be considered limiting.

Referring now to FIG. 3, as well as FIG. 1, the method of managing or conserving power provided to the locator device 12 is shown.

At step 100, a user of the locator device 12 accessing the control interface 21 to signal an activation or "power on" signal. This activation signal is communicated from the control interface 21 to the power source 30. As described above, switches or other controls may be provided at the control interface 21 to allow the user to communicate control signals, such as "power on" to the locator device 12.

At step 110, responsive to this activation signal from the control interface 21, the power source 30 provides power to, inter alia, the wireless receiver 14, the CPU 18, the memory 20, and the cellular modem 24. The locator device is capable at running at a plurality of power levels including at least a "normal" level and a "low" level. At the "normal" level, the CPU 18 is running at its highest clock speed and power is provided at the highest level to all the elements of the locator device 12, including the wireless receiver 14, the CPU 18, the memory 18, and the cellular modem 24 among others. At the "low" level", the CPU 18 is running at a reduced clock speed which is normally half the speed of the highest clock speed, and one or more of the other elements are disabled, shutdown or otherwise provided less power by the power supply. More particularly, communication to the cellular provider 28 via the cellular modem 24 is temporarily interrupted. Normally the power delivered to the cellular modem 24 is interrupted.

Various other intermediary levels may be arranged to provide various power level consumption of the power source 30. The CPU 18 carries out the operation of the managing the power level in which the locator device 12 operates by communicating power level signals to the various elements of the locator device 12, including the power source 30, the wireless receiver 14, and the cellular modem. Initially, during the power on stage of step 110, the CPU 18 sets the locator device to operate at the "normal" level.

At step 120, the CPU 18 carries out an internal check of the locator device 12. The internal check comprises steps of checking the functionality of the wireless receiver 14, the memory 20, the CPU 18, the cellular modem 24, the power source 30, and the control interface 21, among other elements. The CPU 18 also ascertains its serial number or identification number, which may be preprogrammed into a circuit or like hardware device (not shown) such as a ROM chip, which connected to the CPU 18 and provided in the locator device 12. The CPU 18 also loads into memory 20 software or program means for computing positional data. The software may be provided internally in a circuit or like hardware (not shown) connected to the CPU 18 and provided in the locator device 12, or may alternatively be downloaded during this step from the cellular provider 28 via the cellular modem 24.

At step 130, the wireless receiver 14 attempts to synchronize with the visible GPS satellites 22a through 22n. The wireless receiver 14 examines the input stream received into the antenna 16 to ascertain synchronization signals or codes, which are transmitted by the GPS satellites 22*a* through 22*n*. These synchronization codes are used by the receiver 14 to ascertain, among other things, the timing signals necessary to calculate positional data of the locator device 12. Normally, the locator device requires the timing signals from at least two (2) visible GPS satellites in order to calculate its positional data. As noted above, the term "visible" refers to the ability of the locator device 12 to receive synchronization signals, timing signals and other informational data from the GPS satellites 22*a* through 22*n*. The accuracy of the calculation of the positional data is proportional to the number of GPS satellites "visible" to the wireless receiver 14.

At step 140, the CPU 18 make a determination whether the wireless receiver 14 has synchronized with at least two visible GPS satellites as carried out during the synchronization step of 130. If the CPU 18 determines that the wireless receiver 14 has synchronized with at least two visible GPS satellites, steps 140 through 170 are carried out, otherwise steps 180 through 210 are carried out.

At step 150, the wireless receiver 14 carries out the steps of receiving input stream data from the antenna 16 and demodulating GPS signals into serial data as described above. This serial data is then communicated to the CPU 18 for further processing in step 160.

At step 160, the CPU 18 carries out the steps of receiving the serial data from wireless receiver 14 and computing positional data of the locator device 12, as described above. In general the software running on CPU 18 and in memory 20 calculates the distance between the locator device 12 and the GPS satellites synchronized with in step 130 or step 190 using the timing signals provided by the GPS satellites, and carries out standard radiolocation calculations to formulate the positional data which is the location of the locator device 12 relative to the positions of the GPS satellites 22*a* through 22*n*. The calculated positional data is internally stored in a log or record in the memory 20 for future comparison. Also at step 160, the CPU 18 compares the currently calculated positional data with the previously calculated positional data if any to ascertain the velocity or the relative "positional change" of locator device 12.

At step 170, the CPU 18 makes a determination of whether the relative "positional change" calculated in state 160 has increased. As noted above, the locator device 12 periodically communicates positional data to the cellular provider 28. In order to conserve the power source 30, the locator device 12 will decrease the rate of periodic transmission to cellular provider 28 when the locator device 12 is relatively stationary. Conversely, in order to provide accurate positional data to the server computer 38 via cellular provider 28, the rate of periodic transmission from locator device 12 to cellular provider 28 is increased when the relative "positional change" determined to have increased. If the locator device 12 remains at a relatively contact rate of velocity, then the rate of transmission remains relatively constant as well. If the "positional change" has increased, step 220 is carried out, otherwise, step 230 is carried out.

At step 220, the periodic rate at which the cellular modem 24 transmits positional data to the cellular provider 28 is increased. This step provides the server computer 38 with an increased rate of positional data where the locator device is found to be moving rapidly. Steps 130 and 140 are carried out again.

At step 230, the CPU 18 makes a determination of whether the relative "positional change" calculated in step 160 has decreased. If the "positional change" has decreased, step 240 is carried out, otherwise, steps 130 and 140 are carried out again.

At step 240, the periodic rate at which the cellular modem 24 transmits positional data to the cellular provider 28 is decreased. This steps conserves power consumption in the locator device 12 when the device 12 is relatively stationary. Steps 130 and 140 and then repeated.

Steps 180 through 210 are carried out when the CPU 18 determines that the wireless receiver 14 has not synchronized with at least two visible GPS satellites in step 140.

At step 180, the locator device 12 is set to the "low" level of operation described above in order to conserve the power usage drawn from the power source 30. At this level the CPU 18 runs at a reduced clock speed, which is normally half of the highest clock speed. The power to the cellular modem is also terminated or otherwise reduced. Additionally, cellular communication between cellular modem 24 and the cellular provider 28 is temporarily interrupted.

At step 190, the locator device 12 attempts to synchronize with visible GPS satellites using the same steps as carried out in step 130.

At step 200, the CPU 18 makes a determination whether the wireless receiver 14 has synchronized with at least two visible GPS satellites during the synchronization step of 190. If the CPU 18 determines that the wireless receiver 14 has synchronized with at least two visible GPS satellites, step 210 is carried out, otherwise steps 190 and 200 are carried out again.

At step 210, the locator device 12 is restored to the "normal" level of operation described above. At this level, the CPU 18 operates at its fastest clock speed, and power is delivered at the "normal" to the elements of locator device 12 as described earlier in the power on step 110. Cellular communication between cellular modem 24 and cellular provider is also resumed. Steps 150 through 170 are then carried out.

One challenge facing wireless users is placing effective 911 calls. As cell phones replace traditional landline phones for many users, determining the location of a wireless phone in order to direct emergency response personnel is a key issue.

When a caller dials 911, typically the address and phone number of the caller is displayed on a screen at the 911 center. Enhanced 911 or E911 provides dispatchers with the location of callers and their phone number. This is also known as ANI/ALI—automatic number information and automatic location information. Currently, many 911 centers do not receive important location data from wireless telephone calls, resulting in confusion and problems for emergency dispatch services. Also, areas that have multiple 911 centers may have problems routing calls as a result of insufficient location data. Therefore, wireless E911 is one of the most pressing challenges facing the public safety community.

In response, the FCC has developed a set of rules to mandate a series of steps to migrate wireless carriers to 911 capability. The wireless Enhanced 911 (E911) rules seek to improve the effectiveness and reliability of wireless 911 service by providing 911 dispatchers with additional information on wireless 911 calls.

The wireless E911 program is divided into two parts—Phase I and Phase II. Phase I requires carriers, upon appropriate request by a local Public Safety Answering Point (PSAP), to report the telephone number of a wireless 911 caller and the location of the antenna that received the call.

Phase II requires wireless carriers to provide far more precise location information, within 50 to 100 meters in most cases.

The deployment of E911 requires the development of new technologies and upgrades to local 911 PSAPs, as well as coordination among public safety agencies, wireless carriers, technology vendors, equipment manufacturers, and local wireline carriers. The FCC established a four-year rollout schedule for Phase II, beginning Oct. 1, 2001 and to be completed by Dec. 31, 2005.

However, wireless carriers have experienced some difficulty in complying with the mandate, and FCC has granted various limited waivers of the Phase II rules to wireless carriers, subject to revised deployment schedules and quarterly reporting requirements.

Figure 4:
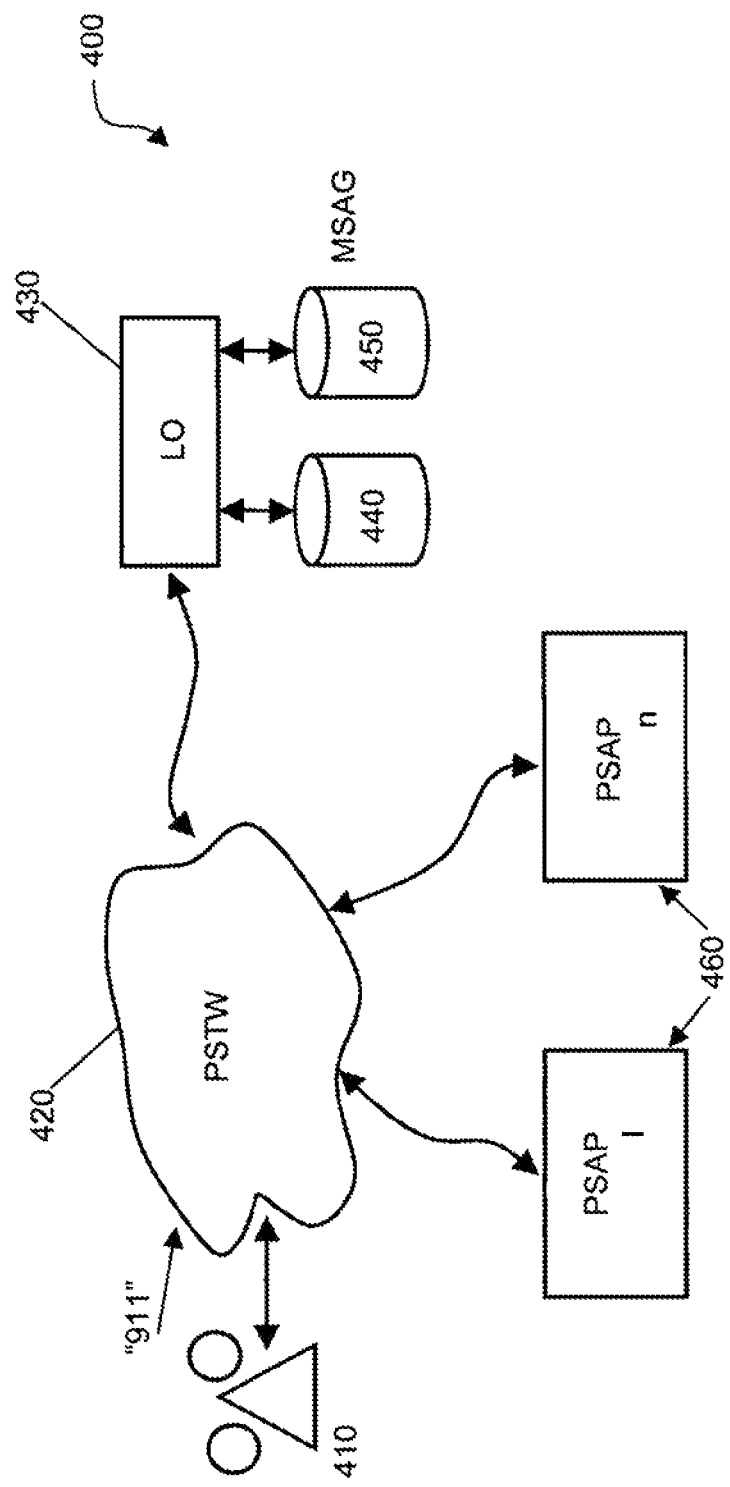
FIG. 4 is a diagram of a prior art 911 system.

FIG. 4 is a block diagram of a wireline E911 system. FIG. 4 includes a Plain Old Telephone Service (POTS) telephone 410 placing a 911 call into the Public Switched Telephone Network (PSTN) 420. Typically, the call will be directed to a Central Office (CO) 430 of a service provider, where a subscriber database 440 is maintained, listing every assigned telephone number, the subscriber's name, address and billing information. Moreover, the service provider already identifies the telephone number for every call placed in order to properly bill the subscriber each month, referred to as Automatic Number Identification (ANI).

An E911 system further includes a Master Street Address Guide (MSAG) database 450 for database cross-referencing every assigned telephone number, subscriber's address and the block number ranges for every street, in every jurisdiction served by the telephone company. Additionally, service provider may provide dedicated switches and networks to carry 911 traffic through a 911 tandem network.

When the caller dials 911, the call is identified by the telephone company central office switch and routed to the 911 network. The ANI (telephone number) information is decoded through a subscriber database to obtain the caller's address and other information. The call is then processed through the MSAG to obtain the ID code of the agency that should handle the call. The 911 network then routes the voice and ANI/ALI information to the correct agency or Public Safety Answering Point (PSAP) 460.

The ANI/ALI information is displayed when the call-taker at the PSAP answers, providing crucial information to direct emergency personnel.

Figure 5:
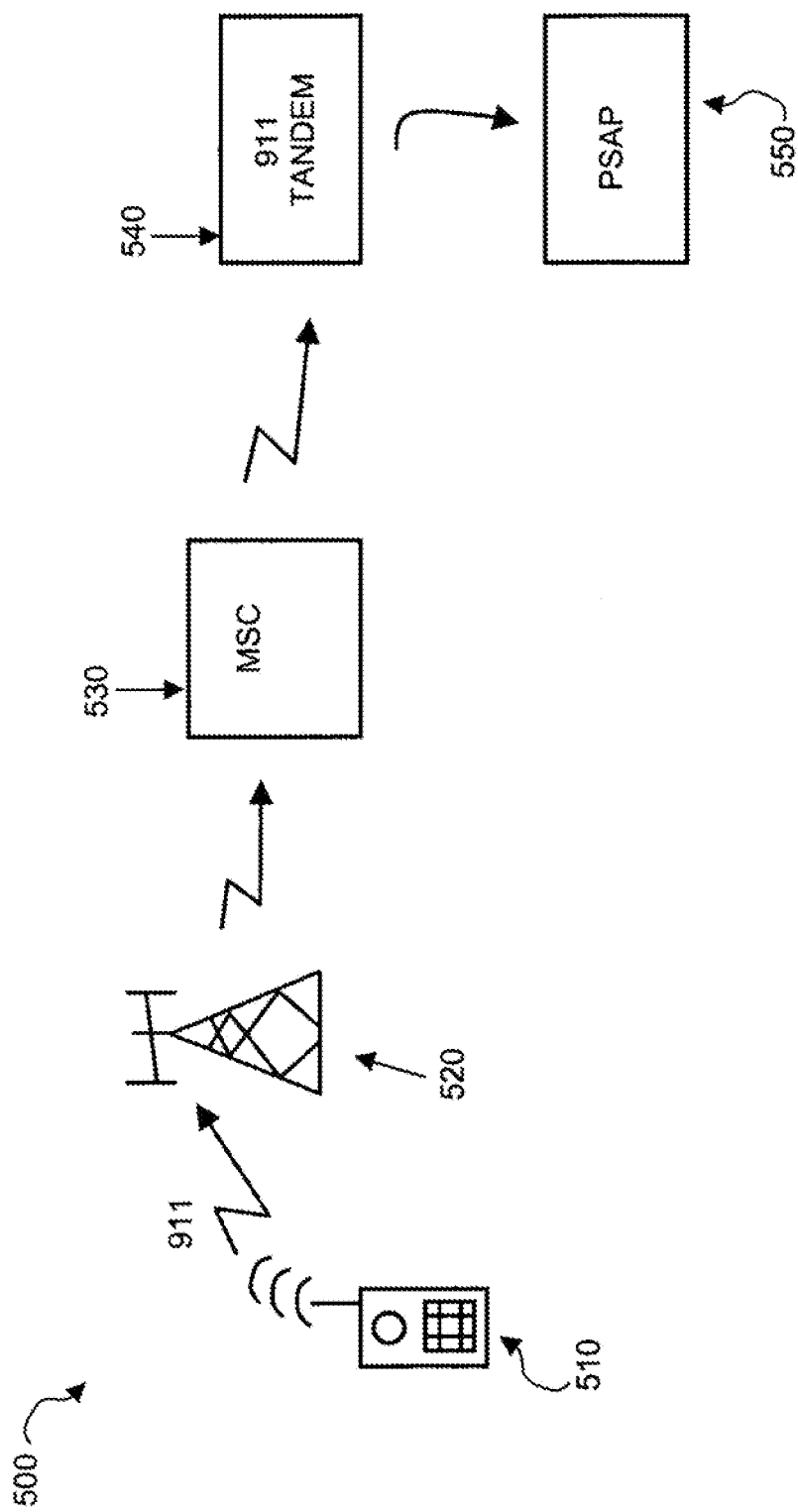
FIG. 5 is a diagram of a prior art E911 system.

FIG. 5 is a block diagram of a Phase 1-compliant wireless E911 system 500.

Under Phase 1 mandates, wireless carriers must provide to PSAPs the telephone number of a wireless 911 caller and cell site or base station receiving a wireless 911 call. In the system 500, when a caller 510 places a 911 call, the call is routed to the Mobile Switching Center (MSC) through tower 520. Under Phase 1, towers are programmed to immediately send any 911 call to the appropriate 911 tandem 540. Additionally, a Pseudo ANI (PANI) is provided that identifies the cell sector (up to three per tower) or just the tower itself.

When the call is relayed to the PSAP 550, the callback number and cell tower of origination to be relayed to the PSAP. Accuracy can range from several hundred square meters to several square kilometers, thereby providing at least location information to a particular region of town.

Under Phase 2 mandates, wireless carriers must also provide to PSAPs the location of a 911 caller by latitude and longitude using either a terminal-based or a network-based technology, resulting in an accuracy of 50 square meters to 300 square meters depending on the technology.

Figure 6A:
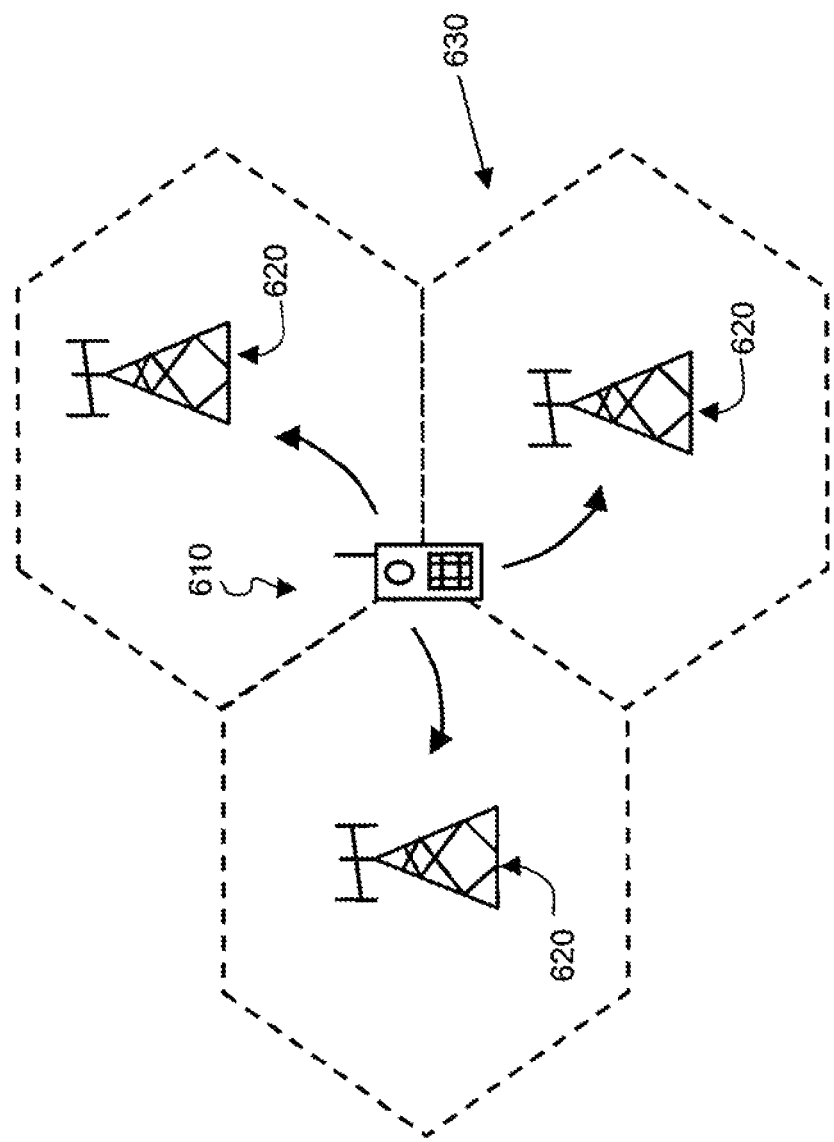
FIGS. 6A-6C are diagrams of prior art E911 systems using network-based location methods.
Figure 6B:
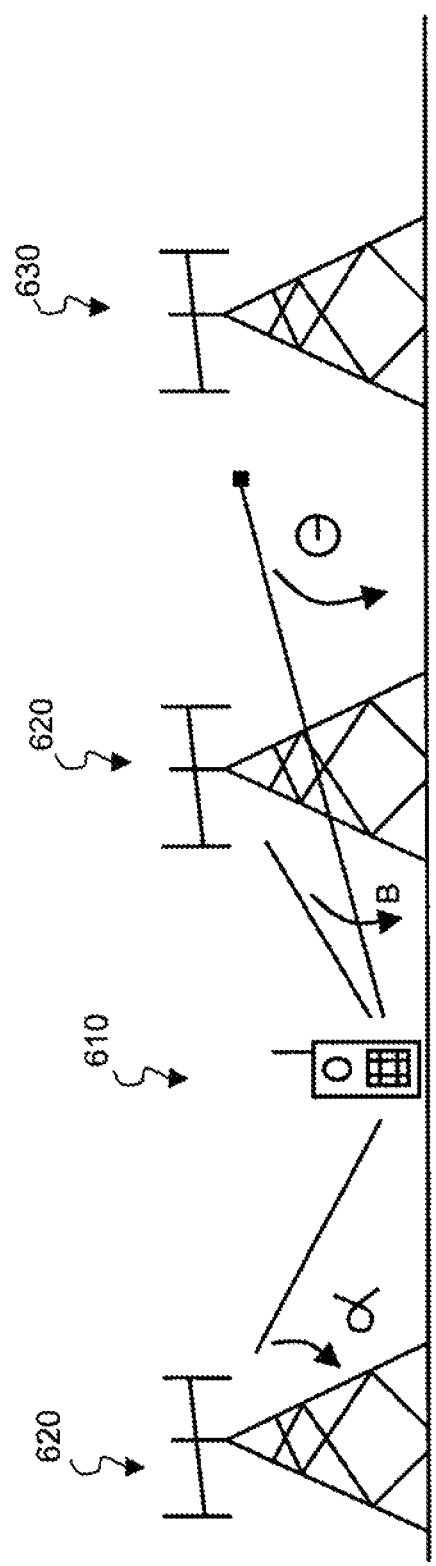
Figure 6C:
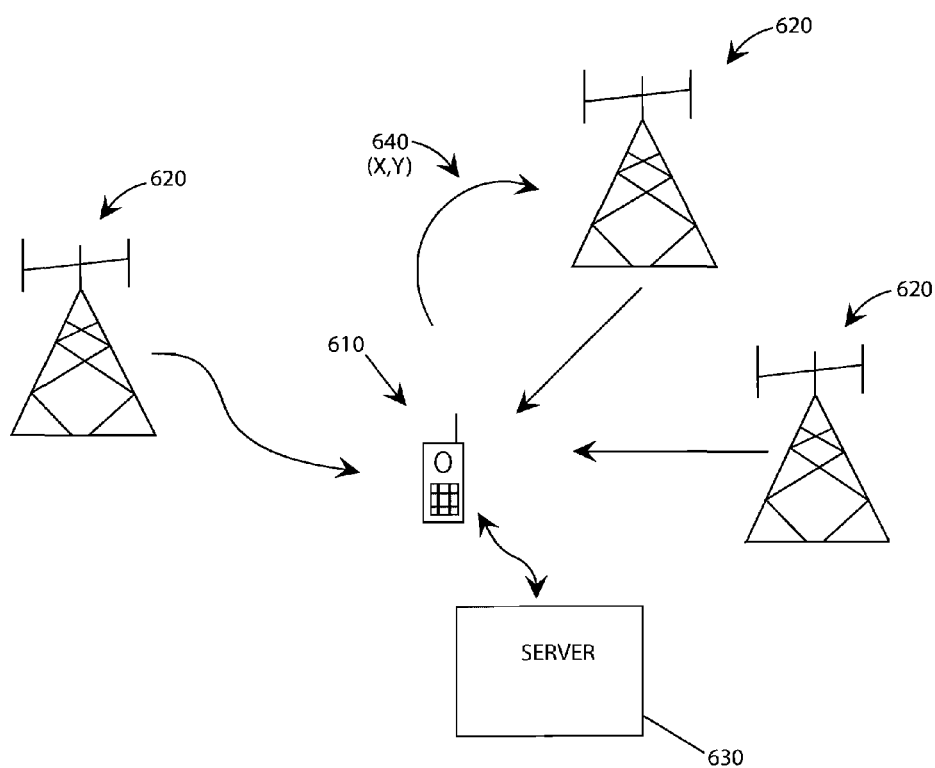

FIGS. 6A-6C depict typical ways wireless carriers can use their network to determine a caller's location. FIGS. 6A-6C represent what is typically erred to as network-based solutions.

FIG. 6A depicts the Time Difference Of Arrival (TDOA) method. Each tower 620 in a TDOA system is configured to measure the amount of time it takes to receive the signal from caller 610.

A typical manner used to locate a wireless caller to use the network of fixed base stations in a wireless provider's network to triangulate the caller's location. In this scenario, each station in a carrier's network is configured to receive a signal from a particular phone making an active call. Two or more towers then compare signals from the active phone and locate it based on relative readings. By cross-referencing this information from other towers in the system, a phone's position is expressed in X and Y coordinates based on longitude and latitude readings.

FIG. 6B depicts the Angle Of Arrival (AOA) method of location, in which the system uses the antenna arrays at a base station to determine the angle at which a wireless phone's signal arrives at the station. By comparing this angle of arrival data among multiple base stations, the relative location of a wireless phone can also be triangulated and expressed in X and Y coordinates.

FIG. 6C is a diagram of the Enhanced Observed Time Difference (EOTD) method. In this method, the phone 610 is configured to determine its position from signals received from the towers 620. This determination made be made with the assistance of a location server 630. The phone then transmits its location information 640 to the system. Under this scenario, a phone can be made 'location-aware', that is, it can continuously track its location throughout a system as long as the phone has sufficient tower visibility.

It will be appreciated that carriers may user combinations of all of the above location methods.

Figure 7:
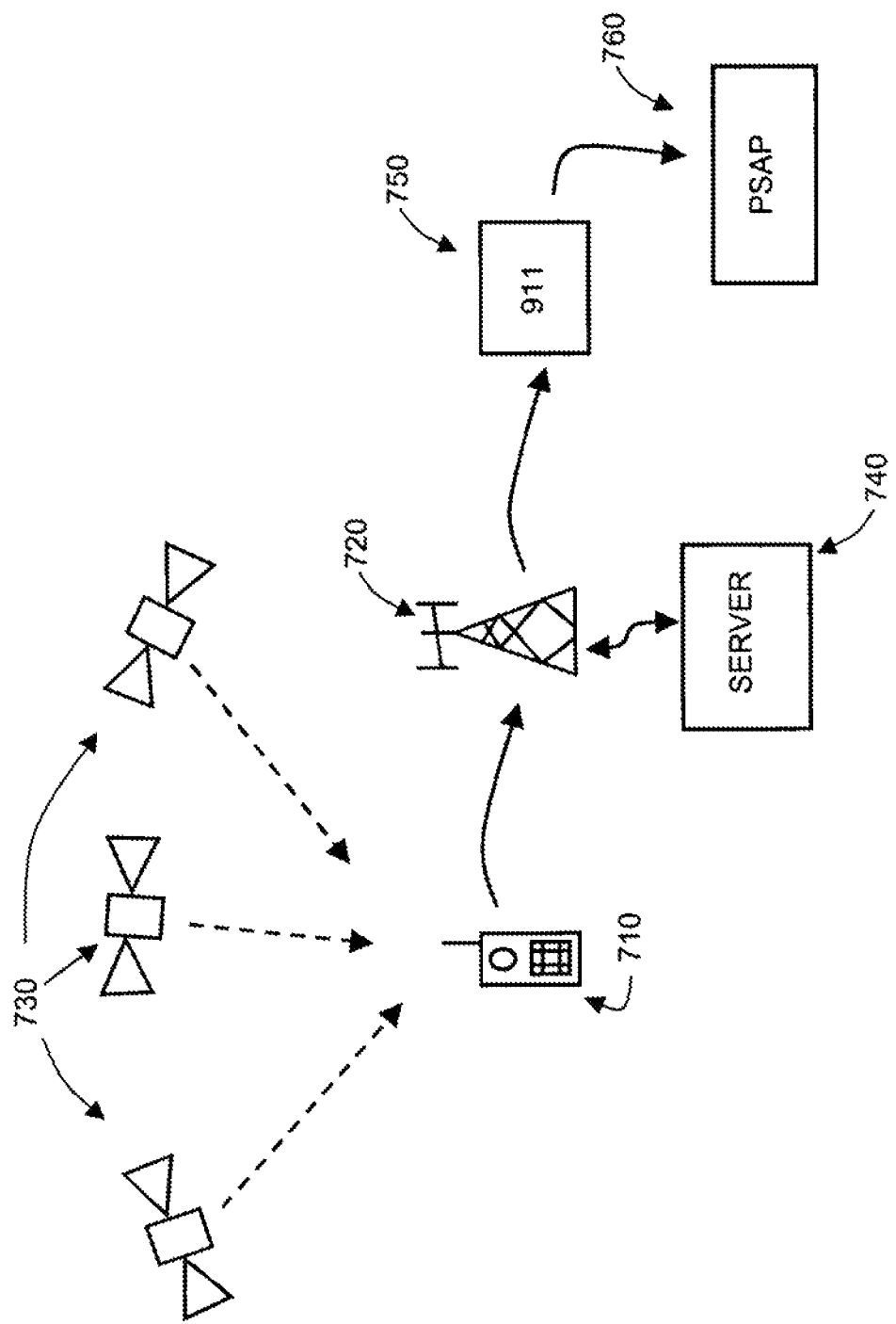
FIG. 7 is a diagram of a prior art E911 system using a terminal-based location method.

FIG. 7 depicts a terminal-based solution using the assistance of the constellation 730 of GPS satellites. The system of FIG. 7 may operate in two manners. First, the phone 710 may be configured to determined its own location as a stand-alone GPS terminal device and transmit its location to the 911 network 750 through tower 720 and ultimately to the correct PSAP 760.

In an Assisted GPS system, the phone may only be required to transmit raw GPS data to the system through tower 720, and the location of the caller is determined with the assistance of a location server 740. The server 740 may use any of the additional information from the network-based methods described above to more quickly determine the caller's location, such as tower location or triangulation data. This allows a much quicker first fix, and ultimately a more accurate location determination.

Figure 8:
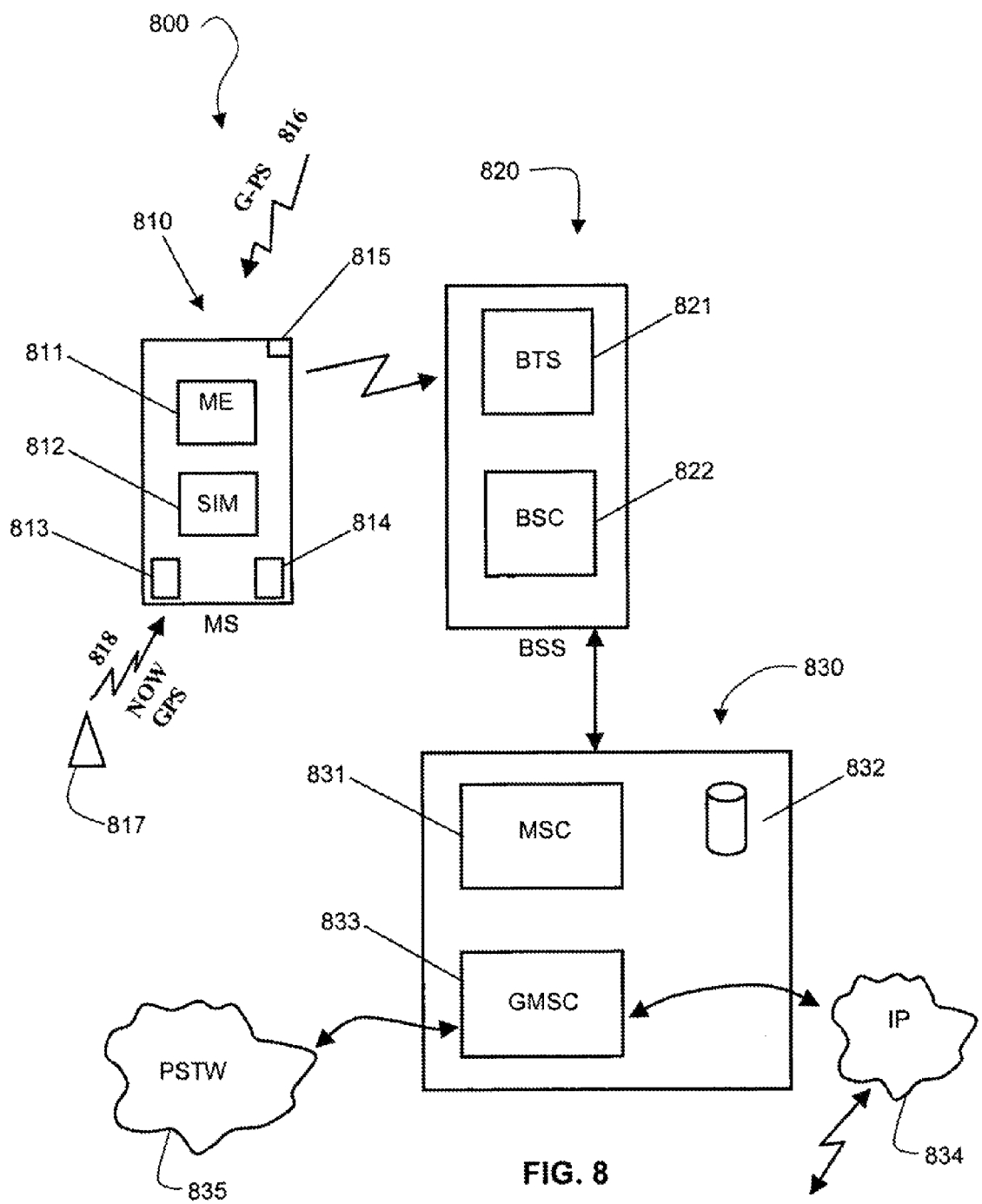
FIG. 8 is a diagram of a locator system configured in accordance with the teachings of this disclosure.

FIG. 8 is an overview of a typical GSM wireless system 800. The system includes a Mobile Station 810 (MS) including the mobile equipment (ME) 811 and a Subscriber Identity Module (SIM) card 812. The ME 811 comprises hardware for enabling radio communication with the network, and is typically identified by its International Mobile Equipment Identity (IMEI).

The SIM card 812 is typically configured to identify the subscriber in the network and stores information necessary for the ME 811 to access the network.

FIG. 8 further includes a Base Station System (BSS) 820. The BSS 820 is configured to place the MS in wireless connectivity with the network. To enable transmission and reception on the network, the BSS 820 includes a Base Transceiver Station (BTS) 821 and a Base Station Controller (BSC) 822. As is appreciated by those of ordinary skill in the art, the BTS 821 is configured to enable the communication between the MS 810 and the network, and comprises radio equipment and antennas to serve a cell. The BSC 822 is configured to manage a group of underlying BTSs.

FIG. 8 further includes a Switching System 830 for managing communications between mobile users and users of other networks or systems, such mobile users on different systems, or fixed telephony users on the Public Switched Telephony Network (PSTN) 835. The switching system also includes databases 832 needed for subscriber data and mobility management.

The switching system 830 typically includes a Mobile Services Switching Center (MSC) 831 for performing the switching functions within the network, connecting calls in the GSM network, or between the GSM network and another networks when necessary.

To provide connectivity between the GSM network and other networks, the switching system 830 may also include a Gateway Mobile services Switching Center (GMSC) 833. The GMSC 833 is preferably configured to operate as a gateway between the GSM network and other networks, such as the PSTN 835, or an IP-compliant network such as the Internet 834.

As mentioned above, the switching system 830 may include databases 832 for storing and retrieving system information. The GMSC 833 may locate in which part of the network the MS 810 is located in by questioning a Home Location Registry (HLR) containing information about subscribers to the network. The HLR also includes information about the subscriber's current location and which MSC serving the user at the moment. The switching system 830 may also include other databases, including a Visitor Location Registry (VLR). The VLR is a regional database, as compared to the HLR that is global, and is found together with every MSC. This register stores information about all subscribers that are registered in that MSC area at the moment.

When the HLR has provided the GMSC 833 with which MSC service area the subscriber is registered in, a more detailed description of which Location Area (LA) the MS will be found in can be obtained from the VLR.

The switching system 830 may also include security-related functionality, such as an Authentication Centre (AUC) for managing data for the authentication of subscribers and encryption. All MSs may be required to go through an authentication process before being provided access to the network. Additionally, an Equipment Identity Register (EIR) may also be provided for hardware security purposes. Information may be stored regarding whether a particular ME is valid, and verify that the equipment is not stolen.

In a preferred embodiment, the MS 810 is GPS-enabled through a GPS chipset 815 configured to determine location from received GPS signals 816. The switching system 830 may be configured to provide location-based services to a subscriber 840, whereby the location of the MS 810 may be provided to a subscriber 840 over the Internet 834. Thus, the switching system 830 is configured to provide the functionality provided by the server computer described above. It is desired in this disclosure that the location-based services be configured to access the E911 location information already present in an E911 compliant system. It is contemplated that the programming for causing the MS to determine its location may reside entirely on the SIM card 812, or utilize memory and processor 814.

In one embodiment, a commercial variant of a E911 protocol may be developed that causes the system to collect E911 information, but routes the location information to a commercial variant of the E911 tandem system. Such an E911 commercial protocol will indicate to the switching system that a particular request is a commercial request, and should not be forwarded to a PSAP. Instead such a protocol will indicate that the location request is of a commercial nature, and location information should be forwarded to the subscriber and the requested billed as a non-emergency provisioned service.

Additionally, the MS 810 may include processor and associated memory 814 for executing location-based services above and beyond those found in typical devices. For example, the MS 810 may be configured to send its location as predetermined intervals to the subscriber 840. For example, the MS may be configured to periodically determine its location and transmit location data to a subscriber, or alternatively, the MS may also be configured to transmit location data to a subscriber when nearing forbidden zones or traveling near boundaries as pre-defined by the subscriber.

It is contemplated that the MS 810 may be configured to execute Java applications, or applications written in the operating system of the MS, such as Palm, Windows for mobile devices, or the Symbian OS.

It is contemplated that the location-based services of this disclosure may also be stored and executed directly or at least partially from the SIM card 812. In this manner, the location-based services desired by subscriber 840 may be provisioned and billed as are other wireless services. In this manner, a parent may activate location-based services without the knowledge of the child. Additionally, as a MS will not properly operate without a SIM card installed, the parent can be assured that a child cannot disable such features. For privacy reasons, the MS may also be configured to require that the remote user consent to enabling the remote tracking features. Additionally, the SIM card may be programmed to periodically determine the location of the MS and send location information to the subscriber, or respond to a location query from the subscriber, without intervention from the remote user.

The subscriber terminal may also be enabled to view the location of the MS through a web page as described above. Additionally, the subscriber may be allowed to enter locations of interest into the web page, and be notified when the MS is near a location. For example, a subscriber may be allowed to enter a street address into a web page, and the system will convert the address into location coordinates and store these coordinates into a database. The system may then query the location of the MS, and alert the subscriber if the MS arrives at the address. The subscriber may also be allowed to associate a time element with an address or series of addresses. In this manner, the system may be allowed to track a remote user's itinerary, and report back to the subscriber the remote user's progress. Thus if the remote user does not reach a desired destination by a specific time, the system will notify the subscriber. It is contemplated that the system may notify the subscriber through any manner provided by the carrier, such as through email, SMS, paging, or automated voice mail.

It is contemplated that the subscriber may also enter communication preferences, whereby the subscriber may enter a desired means of communication regarding the location of the remote user's MS. For example, the subscriber may enter various phone numbers or other information destinations in the order desired to be tried by the system. Additionally, if the network is enabled with the Session Initiation Protocol (SIP), the system may be configured to automatically attempt to contact the subscriber using alternate means.

As is known by those skilled in the art, SIP represents the capability to reach someone regardless of location or device. SIP may be used to signal multiple devices until it finds the subscriber. SIP resides at the application layer of the network and establishes, modifies, and terminates multimedia sessions between intelligent devices, and extends the intelligence of a data network out to the end user at the edge, while allowing the lesser intelligent core to forward communications requests without much effort.

Using SIP, if the subscriber is unavailable, the system may be configured to alert a second party, such as another family member or the subscriber's manager.

If the gateway is VoIP-enabled, then the subscriber may be able to receive location-based services in an IP-compliant environment, such as through a VoIP telephone, or a computer-resident "soft" phone. The gateway may also be enabled to provide VoIP services using either the SIP or H.323 protocols, or both.

Additionally, the system may be enabled to communicate using instant messaging software as is known in the art. Using any or all of the available technologies, a subscriber can be assured that location information regarding the remote user can reach the subscriber.

Thus, if both the remote user and subscriber have IP addresses, the location-based services may be accomplished without the need to provide a location server in the wireless switching system. As long as the E911 location information is available, software resident in the MS and subscriber computers may be configured to query the MS, retrieve location information from the wireless carrier, and forward the information to the subscriber.

However, a challenge still exists if the MS is indoors or otherwise not able to receive a GPS signal. In a further preferred embodiment, the MS 810 may include a secondary means of location 813. This secondary means may include a non-GPS method, such as RF-based means. In this embodiment, the MS 810 is configured to receive secondary location information from a non-GPS source 817 through a non-GPS signal 818.

It is contemplated that secondary sources may be installed at locations where GPS signals are found to be unreliable, or locations where more precise location is desired. Examples include shopping malls, schools, hospitals, and the like. In such situations, while the GPS signal may be unreliable, wireless signals are often available. In one embodiment, the MS may be configured to sense and automatically utilize secondary location methods when GPS signals are unavailable. For example, the MS may also use any of the assisted-GPS location technologies describe above, resort to a network-based method, or use a secondary method.

An example of a secondary location method is an embodiment in which the Bluetooth protocol is employed. In this embodiment, the MS comprises a Bluetooth-enabled wireless phone, and the secondary source 817 represents a Bluetooth station. The MS is configured to discover and establish a connection when the MS is within range. The station 817 transfers its precise location to the MS, which then forwards this information onto the subscriber. It will be appreciated that using a secondary source, precise location of the MS may be determined.

If the secondary source is indeed located in an area where GPS and wireless service is unavailable, the MS may be configured to store secondary location information received from the source 817 and retransmit such data to the subscriber when the MS is back in a service area.

Many automobiles are now Bluetooth enabled, allowing a wireless phone to interact with the control systems of the car. In a further embodiment, the MS may be configured to detect when it is in the car, and alert the subscriber to this fact, as well as when the phone leaves the range of the car. Furthermore, it is contemplated that the car may be configured to relay on-board information to the phone, such as information available through the On Board Diagnostic (OBD) system. Information such as speed and direction may then be forwarded to the subscriber.

It is contemplated that the location information may be sent to the subscriber through the most efficient means. For example, in a GSM system, the data may be sent using the GPRS data channel. However, to ensure that location data is transmitted, the phone may be configured to determine the best available method, and send information or alerts using alternate methods. For example, if the MS enters a forbidden zone as defined by the subscriber, the MS may be configured to send a SMS message, email, or other communication in addition to attempting to send the location information using the data channel of the particular system. If the MS is out of service range, it may be configured to store the alert, and send the alert as soon as service is detected.

In a further embodiment, the MS may be enabled to send multimedia messages using the MultiMedia Message Protocol (MMS). In this embodiment, the remote MS 810 may be configured to determine its position, and create a multimedia message including a graphical representation of its location, such as a message including a map having an indication of the remote user's location thereon. It is contemplated that map information may stored in the phone's memory, and the phone may retrieve maps to create the message. Alternatively, the wireless system may be queried and the message created by the system for forwarding to the subscriber. This may be particularly advantageous when the subscriber unit 840 comprises a wireless phone, allowing the subscriber to view the remote user's location graphically while away from a desktop computer.

Although the description above contains many specificities, these should not be construed as limiting the scope of the invention but as merely providing an illustration of the presently preferred embodiment of the invention. Thus the scope of this invention should be determined by the appended claims and their legal equivalents.

What is claimed is:

1. A locator system comprising:
   a locator device including a GPS receiver, a central processing unit (CPU) coupled to the GPS receiver, a wireless communication interface operable to communicate with a server computer, and a power source operable to provide power to the GPS receiver, the CPU, and the wireless communication interface, the locator device configured to:
   use the GPS receiver to receive signals from a plurality of GPS satellites;
   determine positional data of the locator device based on the received signals;
   use the wireless communication interface to transmit the positional data to the server at a periodic transmission rate;
   determine a relative positional change by comparing currently calculated positional data with previously calculated positional data;
   increase the periodic transmission rate when the relative positional change increases; and decrease the periodic transmission rate when the relative positional change decreases; and a computer software program configured to:
execute on the server computer,
receive the positional data,
receive a request from a client for the positional data of the locator device, and
provide the positional data to the client in response to the request from the client,
wherein the server does not query the locator device for its positional data in response to the request from the client.

2. The locator system of claim 1, wherein the periodic transmission rate varies over time.

3. The locator system of claim 1, wherein the periodic transmission rate is regular.

4. The locator system of claim 1, wherein the positional data includes the altitude of the locator device.

5. The locator system of claim 1, wherein the locator device is configured to determine the positional data based on at least some informational data received through the wireless communication interface.

6. The locator system of claim 1, wherein the locator device directs the transmission of the positional data to the server.

7. The locator system of claim 1, wherein the client receives the positional data in a graphical form.

8. The locator system of claim 7, wherein the graphical form is a map illustration.

9. A method for providing location of a portable locator device, comprising the steps of:
at the portable locator device:
providing power from a power source to components of the locator device;
receiving signals from a plurality of GPS satellites;
determining positional data of the locator device based on the received signals;
transmitting the positional data through a wireless communication network to a server at a periodic transmission rate;
determining a relative positional change by comparing currently calculated positional data with previously calculated positional data;
increasing the periodic transmission rate when the relative positional change increases; and
decreasing the periodic transmission rate when the relative positional change decreases; and
at the server:
receiving a request from a client for the positional data of the locator device; and
providing the positional data to the client in response to the request,
wherein the server does not query the locator device in response to the request from the client.

10. The method of claim 9, wherein the periodic transmission rate varies over time.

11. The method of claim 9, wherein the periodic transmission rate is regular.

12. The method of claim 9, wherein the positional data includes the altitude of the locator device.

13. The method of claim 9, wherein the positional data is based on at least some informational data received through the wireless communication network.

14. The method of claim 9, wherein the locator device directs the transmission of the positional data to the server.

15. The method of claim 9, wherein the client receives the positional data in a graphical form.

16. The method of claim 15, wherein the graphical form is a map illustration.

17. A portable locator device comprising a GPS receiver, a central processing unit (CPU) coupled to the GPS receiver, a wireless communication interface coupled to the CPU, and a power source operable to provide power to the GPS receiver, the CPU, and the wireless communication interface, the locator device configured to:
use the GPS receiver to receive signals from a plurality of GPS satellites;
determine positional data based on the received signals;
use the wireless communication interface to transmit, at a periodic transmission rate, the positional data to a server computer configured to provide the positional data to a client;
determine a relative positional change by comparing currently calculated positional data with previously calculated positional data;
increase the periodic transmission rate when the relative positional change increases; and
decrease the periodic transmission rate when the relative positional change decreases;
wherein the portable locator device provides the positional data to the server without receiving a query from the server for the positional data.

18. The locator device of claim 17, wherein the periodic transmission rate varies over time.

19. The locator device of claim 17, wherein the periodic transmission rate is regular.

20. The locator device of claim 17, wherein the positional data includes the altitude of the locator device.

21. The locator device of claim 17, wherein the locator device is configured to determine the positional data based on at least some informational data received through the wireless communication interface.

22. The locator device of claim 17, wherein the locator device directs the transmission of the positional data to the server.

23. The locator device of claim 17, wherein the client receives the positional data in a graphical form.

24. The locator device of claim 23, wherein the graphical form is a map illustration.

25. A computer server for providing location of a portable locator device, comprising:
one or more computers configured to:
at a periodic rate, receive positional data of the locator device through a wireless communication network, wherein the positional data is based on signals from a plurality of GPS satellites, the periodic rate increasing when a relative positional change of the locator device increases and the periodic rate decreasing when the relative positional change of the locator device decreases, the relative positional change determined by comparing currently calculated positional data of the locator device with previously calculated positional data of the locator device;
receive a request from a client for the positional data of the locator device; and
provide the positional data to the client in response to the request,
wherein the one or more computers provide the positional data to the client without having to query the locator device.

26. The computer server of claim 25, wherein the periodic rate varies over time.

27. The computer server of claim 25, wherein the periodic rate is regular.

28. The computer server of claim 25, wherein the positional data includes the altitude of the locator device.

29. The computer server of claim 25, wherein the positional data is based on at least some informational data transmitted through the wireless communication network.

30. The computer server of claim 25, wherein the one or more computers do not direct the periodic transmission of positional data from the locator device.

31. The computer server of claim 25, wherein the one or more computers arrange the positional data in a graphical form for presentation to the client.

32. The computer server of claim 31, wherein the graphical form is a map illustration.

33. A locator system comprising:
a locator device including a GPS receiver, a central processing unit (CPU) coupled to the GPS receiver, a wireless communication interface operable to communicate with a server computer, and a power source operable to provide power to the GPS receiver, the CPU, and the wireless communication interface, the locator device configured to:
use the GPS receiver to receive signals from a plurality of GPS satellites;
determine positional data of the locator device based on the received signals; and
use the wireless communication interface to transmit the positional data to the server when the locator device travels a specified distance from a previous position; and
a computer software program configured to:
execute on the server computer,
receive the positional data,
receive a request from a client for the positional data of the locator device, and
provide the positional data to the client in response to the request from the client,
wherein the server does not query the locator device for its positional data in response to the request from the client.

34. The locator system of claim 33, wherein the specified distance varies over time.

35. The locator system of claim 33, wherein the specified distance is fixed.

36. The locator system of claim 33, wherein the positional data includes the altitude of the locator device.

37. The locator system of claim 33, wherein the locator device is configured to determine the positional data based on at least some informational data received through the wireless communication interface.

38. The locator system of claim 33, wherein the locator device directs the transmission of the positional data to the server.

39. The locator system of claim 33, wherein the client receives the positional data in a graphical form.

40. The locator system of claim 39, wherein the graphical form is a map illustration.

41. A method for providing location of a portable locator device, comprising the steps of:
at the portable locator device:
providing power from a power source to components of the locator device;
receiving signals from a plurality of GPS satellites;
determining positional data of the locator device based on the received signals; and
transmitting the positional data through a wireless communication network to a server when the locator device travels a specified distance from a previous position; and
at the server:
receiving a request from a client for the positional data of the locator device; and
providing the positional data to the client in response to the request,
wherein the server does not query the locator device for its positional data in response to the request from the client.

42. The method of claim 41, wherein the specified distance varies over time.

43. The method of claim 41, wherein the specified distance is fixed.

44. The method of claim 41, wherein the positional data includes the altitude of the locator device.

45. The method of claim 41, wherein the positional data is based on at least some informational data received through the wireless communication network.

46. The method of claim 41, wherein the locator device directs the transmission of the positional data to the server.

47. The method of claim 41, wherein the client receives the positional data in a graphical form.

48. The method of claim 47, wherein the graphical form is a map illustration.

49. A portable locator device comprising a GPS receiver, a central processing unit (CPU) coupled to the GPS receiver, a wireless communication interface coupled to the CPU, and a power source operable to provide power to the GPS receiver, the CPU, and the wireless communication interface, the locator device configured to:
use the GPS receiver to receive signals from a plurality of GPS satellites;
determine positional data based on the received signals;
use the wireless communication interface to transmit, when the locator device travels a specified distance from a previous position, the positional data to a server computer configured to provide the positional data to a client;
wherein the portable locator device provides the positional data to the server without receiving a query from the server for the positional data.

50. The locator device of claim 49, wherein the specified distance varies over time.

51. The locator device of claim 49, wherein the specified distance is fixed.

52. The locator device of claim 49, wherein the positional data includes the altitude of the locator device.

53. The locator device of claim 49, wherein the locator device is configured to determine the positional data based on at least some informational data received through the wireless communication interface.

54. The locator device of claim 49, wherein the locator device directs the transmission of the positional data to the server.

55. The locator device of claim 49, wherein the client receives the positional data in a graphical form.

56. The locator device of claim 55, wherein the graphical form is a map illustration.

57. A computer server for providing location of a portable locator device, comprising:
one or more computers configured to:
receive positional data of the locator device through a wireless communication network when the locator device travels a specified distance from a previous position, wherein the positional data is based on signals from a plurality of GPS satellites;

receive a request from a client for the positional data of the locator device; and provide the positional data to the client in response to the request, wherein the one or more computers provide the positional data to the client without having to query the locator device.

58. The computer server of claim 57, wherein the specified distance varies over time.

59. The computer server of claim 57, wherein the specified distance is fixed.

60. The computer server of claim 57, wherein the positional data includes the altitude of the locator device.

61. The computer server of claim 57, wherein the positional data is based on at least some informational data received through the wireless communication network.

62. The computer server of claim 57, wherein the one or more computers do not direct the transmission of positional data from the locator device.

63. The computer server of claim 57, wherein the one or more computers arrange the positional data in a graphical form for presentation to the client.

64. The computer server of claim 63, wherein the graphical form is a map illustration.

* * * * *